(12) United States Patent
Liang

(10) Patent No.: US 9,713,111 B2
(45) Date of Patent: Jul. 18, 2017

(54) METHOD, DEVICE AND SYSTEM FOR RECORDING ATTENDANCE

(71) Applicant: ZTE Corporation, Shenzhen (CN)

(72) Inventor: Yaojuan Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 16 days.

(21) Appl. No.: 14/443,821

(22) PCT Filed: Sep. 18, 2013

(86) PCT No.: PCT/CN2013/083775
§ 371 (c)(1),
(2) Date: May 19, 2015

(87) PCT Pub. No.: WO2014/075511
PCT Pub. Date: May 22, 2014

(65) Prior Publication Data
US 2015/0312872 A1 Oct. 29, 2015

(30) Foreign Application Priority Data
Nov. 19, 2012 (CN) .......................... 2012 1 0469383

(51) Int. Cl.
*H04W 60/00* (2009.01)
*G07C 1/10* (2006.01)
(Continued)

(52) U.S. Cl.
CPC .............. *H04W 60/00* (2013.01); *G07C 1/10* (2013.01); *H04W 4/04* (2013.01); *H04W 8/02* (2013.01);
(Continued)

(58) Field of Classification Search
CPC ... H04W 60/00; H04W 60/06; H04W 84/045; H04W 8/02; H04W 24/02; H04W 40/22;
(Continued)

(56) References Cited

U.S. PATENT DOCUMENTS

2003/0197607 A1  10/2003  Striemer
2006/0169765 A1  8/2006  Ginskey
(Continued)

FOREIGN PATENT DOCUMENTS

CN      1716291 A    1/2006
CN   101159912 A    4/2008
(Continued)

OTHER PUBLICATIONS

International Search Report for corresponding application PCT/CN2013/083775 filed Sep. 18, 2013; Mail date Dec. 19, 2013.
(Continued)

*Primary Examiner* — Phuoc H Doan
(74) *Attorney, Agent, or Firm* — Cantor Colburn LLP

(57) ABSTRACT

The disclosure provides a method device and system for recording an attendance. The method includes that: a Femto (74) receives a registration request or a de-registration request of a mobile terminal (72), wherein the registration request or the de-registration request includes an identifier of the mobile terminal (72); and the Femto (74) saves the identifier of the mobile terminal (72) and time corresponding to the registration request or the de-registration request of the mobile terminal (72) together to serve as an attendance record of a user corresponding to the mobile terminal (72). The method, device and system for recording an attendance solve the problems of great configuration difficulty and high cost of a system for implementing attendance recording in
(Continued)

related technologies, and realize fully-automatic attendance statistics; and this implementation mode is easy to operate and low in cost.

16 Claims, 6 Drawing Sheets

(51) Int. Cl.
    *H04W 84/04*     (2009.01)
    *H04W 8/02*     (2009.01)
    *H04W 60/06*     (2009.01)
    *H04W 4/04*     (2009.01)

(52) U.S. Cl.
    CPC ......... *H04W 60/06* (2013.01); *H04W 84/045* (2013.01)

(58) Field of Classification Search
    CPC .... H04W 4/14; H04W 76/021; H04L 65/1006
    USPC .................. 455/435.1, 434, 458, 456.1, 561; 370/328, 236
    See application file for complete search history.

(56) References Cited

U.S. PATENT DOCUMENTS

2010/0069062 A1*   3/2010   Horn ..................... H04W 60/00 455/434
2011/0217947 A1   9/2011   Czaja
2012/0077493 A1   3/2012   Robbins

FOREIGN PATENT DOCUMENTS

| | | |
|---|---|---|
| CN | 101237704 A | 8/2008 |
| CN | 202502546 U | 10/2012 |
| EP | 2458900 A1 | 5/2012 |
| JP | 2012079201 A | 4/2012 |

OTHER PUBLICATIONS

European Search Report for corresponding application EP 13 85 5391; Report dated Oct. 26, 2015.

* cited by examiner

METHOD, DEVICE AND SYSTEM FOR RECORDING ATTENDANCE

TECHNICAL FIELD

The disclosure relates to the field of communications, and in particular to a method, device and system for recording an attendance.

BACKGROUND

As an essential tool for collecting statistics to attendance of employees in various enterprises and institutions, an attendance system is already so widespread. From the original mechanical type to the current electronic type, and from a contact type to a contactless type, the attendance system has been developed for a considerably long time until the currently most popular electronic attendance system with contactless IC card. Now, the improvement and evolution of the communication technology present new opportunities for development of the attendance system.

The current communication technology has been developed into a period of 2G and 3G coexisting based on 3G, and developing towards Long Term Evolution (LTE). For pursuing higher efficiency, more excellent quality and more services of a communication network, operators adopt carriers with higher frequency, which causes the problems of decrease of coverage area and needing to increase more hardware cost. Aiming at the above problems, a Femto is the most effective method for solving such problems. Meanwhile, because the Femto changes some inherent forms of the past communication network, the Femto has new characteristics; for example, the characteristics of private attribute and customizability of the Femto bring more opportunities for development of other technologies.

At present, there are some methods and systems for implementing attendance over the common communication network in related technologies, but all these methods and systems basically need to make some customized designs for a mobile terminal, a common macro element and even a core network device. However, these customized designs involve that the operators need to update existing devices or individually customize new-purchased devices. Obviously, such an implementing method extends the problem of private attribute of a user side to an operator side, understandably, it is difficult to implement and high in cost.

Aiming at the problems of great configuration difficulty and high cost of a system for implementing attendance recording in related technologies, an effective solution has not been presented.

SUMMARY

The disclosure provides a method, device and system for recording an attendance for at least solving the above problem.

According to one aspect of the disclosure, a method for recording an attendance is provided, which includes that: a Femto receives a registration request or a de-registration request of a mobile terminal, wherein the registration request or the de-registration request includes an identifier of the mobile terminal; and the Femto saves the identifier of the mobile terminal and the time corresponding to the registration request or the de-registration request of the mobile terminal together to serve as an attendance record of a user corresponding to the mobile terminal.

Preferably, after the Femto saves the identifier and the time corresponding to the registration request or the de-registration request of the mobile terminal together, the method further includes: an attendance platform obtains the identifier of the mobile terminal and the time corresponding to the registration request or the de-registration request of the mobile terminal which are saved in one or more Femto; and the attendance platform collects statistics to attendance records of the user corresponding to the mobile terminal according to the identifier of the mobile terminal and the time corresponding to the registration request or the de-registration request of the mobile terminal.

Preferably, the attendance platform collecting statistics to the attendance records of the user corresponding to the mobile terminal according to the identifier of the mobile terminal and the time corresponding to the registration request or the de-registration request of the mobile terminal includes that: the attendance platform reads a correspondence table for the identifier of the mobile terminal and a name of a user whose attendance is to be recorded in a database; according to the correspondence table for the identifier of the mobile terminal and the name of the user whose attendance is to be recorded, the attendance platform replaces, in a correspondence table for the identifier of the mobile terminal and the time corresponding to the registration request or the de-registration request of the mobile terminal, the identifier of the mobile terminal with the name of the user corresponding to the mobile terminal to generate an attendance record table of the user.

Preferably, the attendance platform collecting statistics to the attendance records of the user corresponding to the mobile terminal according to the identifier of the mobile terminal and the time corresponding to the registration request or the de-registration request of the mobile terminal includes that: the attendance platform records the earliest registration request of the mobile terminal during the first specified time period as an on-duty attendance record of the user corresponding to the mobile terminal; and/or, the attendance platform records the latest de-registration request of the mobile terminal during the second specified time period as an off-duty attendance record of the user corresponding to the mobile terminal.

Preferably, the attendance platform obtaining the identifier of the mobile terminal and the time corresponding to the registration request or the de-registration request of the mobile terminal which are saved in one or more Femto includes that: the attendance platform obtains the identifier of the mobile terminal and the time corresponding to the registration request or the de-registration request of the mobile terminal which are saved in one or more Femto during the specified time period.

Preferably, before the attendance platform obtains the identifier of the mobile terminal and the time corresponding to the registration request or the de-registration request of the mobile terminal which are saved in one or more Femto, the method further includes that: the attendance platform receives mobile terminal information submitted by the user; and the attendance platform saves a correspondence between the name of the user and the identifier of the mobile terminal in the database according to the mobile terminal information.

Preferably, after the attendance platform establishes and saves a correspondence table for the name of the user and the identifier of the mobile terminal according to the mobile terminal information, the method further includes that: the attendance platform sets operation permission of logging in the attendance platform for the user.

Preferably, after the attendance platform collects statistics to the attendance record of the user corresponding to the mobile terminal according to the identifier of the mobile terminal and the time corresponding to the registration request or the de-registration request of the mobile terminal, the method further includes that: the attendance platform receives at least one operation instruction of a login user, wherein the at least one operation instruction include at least one of the followings: an operation instruction for querying the attendance records of a specified user, an operation instruction for displaying an attendance statistics result of the specified user, and an operation instruction for informing the specified user of an abnormal attendance situation; and the attendance platform determines, based on the operation permission corresponding to the login user, whether to operate correspondingly according to the operation instructions.

Preferably, the time corresponding to the registration request or the de-registration request of the mobile terminal includes at least one of the followings: the time when the Femto receives the registration request or the de-registration request of the mobile terminal; and the time of initiating the registration request or the de-registration request which is carried in the registration request or the de-registration request.

Preferably, the identifier of the mobile terminal includes: an International Mobile Equipment Identity (IMEI) of the mobile terminal.

Preferably, after the Femto receives the registration request or the de-registration request of the mobile terminal, the method further includes that: the Femto provides a preset Public Land Mobile Network (PLMN) Identity (ID) for the mobile terminal.

According to another aspect of the disclosure, a device for recording an attendance is provided, which is provided in the Femto and includes: a first receiving component configured to receive the registration request or the de-registration request of the mobile terminal, wherein the registration request or the de-registration request includes the identifier of the mobile terminal; and a saving component configured to save the identifier of the mobile terminal and the time corresponding to the registration request or the de-registration request of the mobile terminal together to serve as the attendance record of the user corresponding to the mobile terminal.

According to another aspect of the disclosure, a system for recording an attendance is also provided, which includes the device for recording the attendance. The system for recording the attendance further includes: an attendance platform, wherein the attendance platform includes: an obtaining component configured to obtain the identifier of the mobile terminal and the time corresponding to the registration request or the de-registration request of the mobile terminal which are saved in one or more Femto; and a statistics component configured to collect statistics to the attendance record of the user corresponding to the mobile terminal according to the identifier of the mobile terminal and the time corresponding to the registration request or the de-registration request of the mobile terminal.

Preferably, the statistics component includes: a reading component configured to read the correspondence table for the identifier of the mobile terminal and the name of the user whose attendance is to be recorded in the database; and a generating component configured to, according to the correspondence table for the identifier of the mobile terminal and the name of the user whose attendance is to be recorded, replace, in the correspondence table for the identifier of the mobile terminal and the time corresponding to the registration request or the de-registration request of the mobile terminal, the identifier of the mobile terminal with the name of the user corresponding to the mobile terminal to generate an attendance record table of the user.

Preferably, the statistics component includes: a first recording element configured to record the earliest registration request of the mobile terminal during the first specified time period as an on-duty attendance record of the user corresponding to the mobile terminal; and/or, a second recording element configured to record the latest de-registration request of the mobile terminal during the second specified time period as an off-duty attendance record of the user corresponding to the mobile terminal.

Preferably, the obtaining component is further configured to obtain the identifier of the mobile terminal and the time corresponding to the registration request or the de-registration request of the mobile terminal which are saved in one or more Femto during the specified periods of time.

Preferably, the attendance platform further includes: a second receiving component configured to receive the mobile terminal information submitted by the user; and a binding component configured to save the correspondence between the name of the user and the identifier of the mobile terminal in the database according to the mobile terminal information.

Preferably, the attendance platform further includes: a setting component configured to set the operation permission of logging in the attendance platform for the user.

Preferably, the attendance platform further includes: a third receiving component configured to receive at least operation instruction of the login user, wherein the at least one operation instruction include at least one of the followings: an operation instruction for querying the attendance records of the specified user, an operation instruction for displaying the attendance statistics result of the specified user, and an operation instruction for informing the specified user of the abnormal attendance situation; and a determining component configured to determine, based on the operation permission corresponding to the login user, whether to operate correspondingly according to the operation instructions.

By the way that the Femto receives the registration request or the de-registration request of the mobile terminal, wherein the registration request or the de-registration request includes the identifier of the mobile terminal, and the Femto saves the identifier of the mobile terminal and the time corresponding to the registration request or the de-registration request of the mobile terminal together to serve as the attendance records of the user corresponding to the mobile terminal, the disclosure solves the problems of great configuration difficulty and high cost of a system for implementing attendance recording in related technologies, and realizes fully-automatic attendance statistics; and the implementation mode is easy to operate and low in cost.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form improper limit to the disclosure. In the accompanying drawings.

DETAILED DESCRIPTION OF THE EMBODIMENTS

The disclosure is elaborated below with reference to the accompanying drawings and embodiments. Note that, embodiments and features in embodiments in the application can be combined with each other on condition of not conflicting.

In the present embodiment, an attendance recording solution based on the Femto is provided. Although the Femto is obtained from operators finally and also standardized as a communication device, because its users are private users, such as family or enterprise, private attribute, differentiation and customizability of the Femto will be able to meet differentiated demands of different users.

Figure 1:
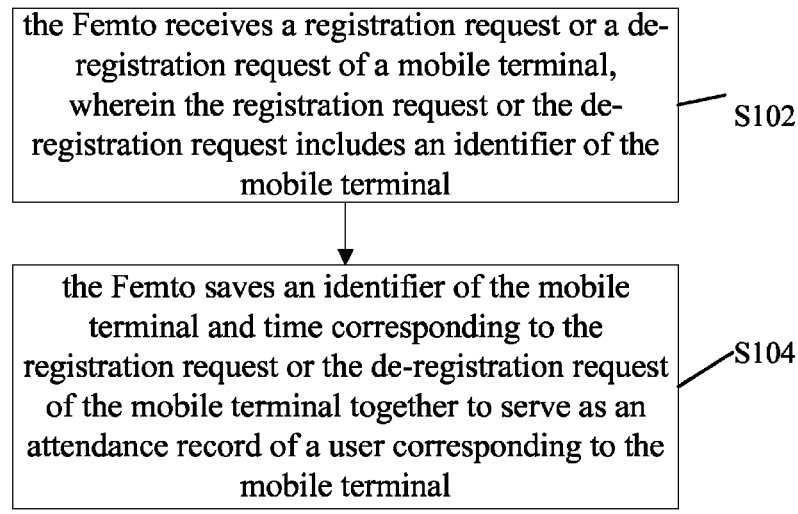
FIG. 1 is a flowchart of a method for recording an attendance according to an embodiment of the disclosure.

According to an embodiment of the disclosure, a method for recording an attendance is provided. FIG. 1 is a flowchart of a method for recording an attendance according to an embodiment of the disclosure. As shown in FIG. 1, the method includes the following steps.

Step 102: the Femto receives a registration request or a de-registration request of a mobile terminal, wherein the registration request or the de-registration request includes an identifier of the mobile terminal; and Step 104: the Femto saves an identifier of the mobile terminal and time corresponding to the registration request or the de-registration request of the mobile terminal together to serve as an attendance record of a user corresponding to the mobile terminal.

Through the above steps, the present embodiment uses the way that the Femto receives the registration request or the de-registration request of the mobile terminal, wherein the registration request or the de-registration request includes the identifier of the mobile terminal, and the Femto saves the identifier of the mobile terminal and the time corresponding to the registration request or the de-registration request of the mobile terminal together to serve as the attendance record of the user corresponding to the mobile terminal. The present embodiment utilizes the characteristics of private attribute, differentiation and customizability of the Femto to record the time when the mobile terminal registers or de-registers to the Femto and the identifier of the mobile terminal together, that is, the time when the user carrying its mobile terminal enters or leaves a coverage area of the Femto is recorded. Therefore, a record of time when the user enters and leaves the coverage area of the Femto may be obtained without needing the user to register or swipe initiatively, the problems of great configuration difficulty and high cost of the system for implementing attendance recording in related technologies are solved, and fully-automatic attendance statistics is realized; and this implementation mode is easy to operate and low in cost.

Preferably, after the Femto records the attendance record of the user corresponding to the mobile terminal, an attendance platform collects and process identifiers of the mobile terminal and the time corresponding to the registration request or the de-registration request of the mobile terminal which are saved in one or more Femto, and collects statistics to attendance records of the user corresponding to the mobile terminal according to the identifier of the mobile terminal and the time corresponding to the registration request or the de-registration request of the mobile terminal. The attendance platform may be a database. In this way, the attendance records of the user corresponding to the mobile terminal which are recorded in the Femto are collected, processed and subjected to statistics, thus, according to the records in the Femto, attendance results of the user may be obtained based on different regulations on management, such as late arrival, early leave, absence from duty and overtime, and the basic function of attendance signature is achieved.

Preferably, in the process of implementing the above solution, a correspondence table for the mobile terminal and the name of the user whose attendance needs to be recorded may be saved in a database system of the attendance platform in advance, the attendance platform may read the correspondence table for the identifier of the mobile terminal and the name of the user whose attendance is to be recorded, and directly replaces, according to the correspondence table for the mobile terminal and the name of the user whose attendance needs to be recorded, the identifier of the mobile terminal, which is obtained from the Femto and is in the correspondence table for the identifier of the mobile terminal and the time corresponding to the registration request or the de-registration request of the mobile terminal, with the name of the user corresponding to the mobile terminal to generate an attendance record table of the user. This way is simple and fast to implement, and makes the attendance results generated by the attendance platform is readable, which is convenient for related person to check the record.

When an attendance recording function is implemented specifically, not only whether the user has signed in that day but also on-duty time and off-duty time of the user need to be recorded, and the normal on-duty time and off-duty time often centralize in the specified periods of time; preferably, the attendance platform may record the earliest registration request of the mobile terminal during the first specified time period (e.g., 8:00 am-10:00 am) which is in a specified time period (e.g., 8:00 am-8:00 pm from Monday to Friday) as the on-duty attendance record of the user corresponding to the mobile terminal; and/or, the attendance platform may record the latest de-registration request of the mobile terminal during the second specified time period (e.g., 5:00 pm-8:00 pm) which is in the specified time period as the off-duty attendance record of the user corresponding to the mobile terminal. In this way, the on-duty time and the off-duty time of the user may be recorded effectively, and the on-duty and off-duty attendance results of the user are obtained automatically through statistics, thereby realizing effective supervision of the attendance system to working time of the user.

In the process of implementation, because it is only needed to collect statistics to the attendance records in the specified time period (the regular working time of workday, e.g., 8:00 am-8:00 pm from Monday to Friday), as a preferred implementation mode, the attendance platform may obtain only the records in the specified time period when collecting the identifier of the mobile terminal and the time corresponding to the registration request or the de-registration request of the mobile terminal which are saved in one or more Femto. In this way, storage resources of the attendance platform are saved. More preferably, the characteristic of customizability of the Femto may also be utilized to record only the identifiers of the mobile terminal and the time corresponding to the registration request or the de-registration request of the mobile terminal in the specified time period, so as to save the storage resources of the Femto.

Preferably, when the user uses the attendance recording solution of the present embodiment for the first time, or changes the used mobile terminal, the user may bind himself/herself with the specified mobile terminal in the attendance platform. In this case, the attendance platform may receive the mobile terminal information submitted by the user, and use the database of the attendance platform to bind the user with the identifier of the mobile terminal according to the mobile terminal information. For example, the attendance platform may save, according to the mobile terminal information, the correspondence between the name of the user and the identifier of the mobile terminal in the database. In this way, the user may select the mobile terminal associated with him/her independently, which improves the user experience of the solution.

Preferably, the user may query, display and make other operations to his/her attendance records or the attendance records of other people. Considering that different users have different requirements for access permission, for example, an ordinary employee only needs to query his/her own attendance records, a manager needs to query the attendance records of other people, and the human resources department needs to check the attendance records of multiple users, and warns and informs the user with abnormal attendance record, so the operation permission owning after logging in the attendance platform may be set for the user in the attendance platform.

Preferably, the user may access the attendance platform by directly logging in the attendance platform; or, the user may also access the attendance platform by logging in the attendance platform through the mobile terminal bound with him/her or other specified mobile terminal. The mobile terminal used for logging in the attendance platform is a customized mobile terminal or needs to be installed a specialized application or plug-in. The attendance platform receives at least one operation instruction of the login user, wherein the at least one operation instruction may include but are not limited to at least one of the followings: an operation instruction for querying the attendance record of the specified user, an operation instruction for displaying the attendance statistics result of the specified user, and an operation instruction for informing the specified user of the abnormal attendance situation. The attendance platform may determine, based on the operation permission corresponding to the login user, whether to operate correspondingly according to the operation instructions. In the case of satisfying the permission, the attendance platform may operate correspondingly according to the operation instruction; and in the case of not satisfying the permission, the attendance platform may reject or ignore the operation instructions. In this way, practicality and convenience of the attendance platform are improved.

Preferably, the time corresponding to the registration request or the de-registration request of the mobile terminal may be the time when the Femto receives the registration request or the de-registration request of the mobile terminal, or the time of initiating the registration request or the de-registration request which is carried in the registration request or the de-registration request. Of course, the time corresponding to the registration request or the de-registration request may also be obtained in other ways, as long as the time when the user enters or leaves the coverage area of the Femto can be reflected.

Preferably, the identifier of the mobile terminal may be an IMEI of the mobile terminal.

Preferably, the Femto may also provide a preset personalized PLMN ID for the mobile terminal, reflects it to a user interface, and displays a personalized logo. In this way, after the user enters the coverage area of the Femto, it may be known through the logo that the user has entered the coverage area of the Femto, and has successfully carried out attendance registration at the same time.

Corresponding to the above method, a device for recording an attendance is provided in the embodiments. The device is in the Femto and used for implementing the above embodiment and preferred implementation mode, and these described yet will not be repeated here. For example, the term "component" used below can be a combination of software and/or hardware for implementing predetermined functions. Although the device described in following embodiments is implemented by software preferably, implementation of hardware or a combination of software and hardware can also be possible and conceived.

Figure 2:
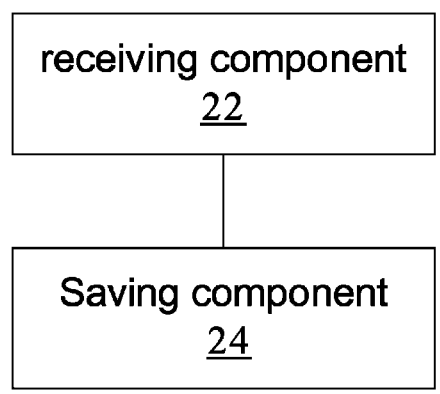
FIG. 2 is a structural diagram of a device for recording an attendance according to an embodiment of the disclosure.

FIG. 2 is a structural diagram of a device for recording an attendance according to an embodiment of the disclosure. As shown in FIG. 2, the device includes: a first receiving component 22 and a saving component 24; the components are elaborated below.

The first receiving component 22 is configured to receive the registration request or the de-registration request of the mobile terminal, wherein the registration request or the de-registration request includes an identifier of the mobile terminal. The saving component 24 is connected with the first receiving component 22 and configured to save the identifier of the mobile terminal which is received by the first receiving component 22 and the time corresponding to the registration request or the de-registration request of the mobile terminal together to serve as the attendance record of the user corresponding to the mobile terminal.

The present embodiment uses the way that the first receiving component 22 of the Femto receives the registration request or the de-registration request of the mobile terminal, wherein the registration request or the de-registration request includes the identifier of the mobile terminal, and the saving component 24 of the Femto saves the identifier of the mobile terminal and the time corresponding to the registration request or the de-registration request of the mobile terminal together to serve as the attendance record of the user corresponding to the mobile terminal. and the above solution utilizes the characteristics of private attribute, differentiation and customizability of the Femto to record the time when the mobile terminal registers or ceases registration to the Femto and the identifier of the mobile terminal together, that is, the time when the user carrying its mobile terminal enters or leaves the coverage area of the Femto is recorded. Therefore, the record of time when the user enters and leaves the coverage area of the Femto may be obtained without needing the user to register or swipe initiatively, the problems of great configuration difficulty and high cost of the system for implementing attendance recording in related technologies are solved, and fully-automatic attendance statistics is realized; and this implementation mode is easy to operate and low in cost.

Figure 3:
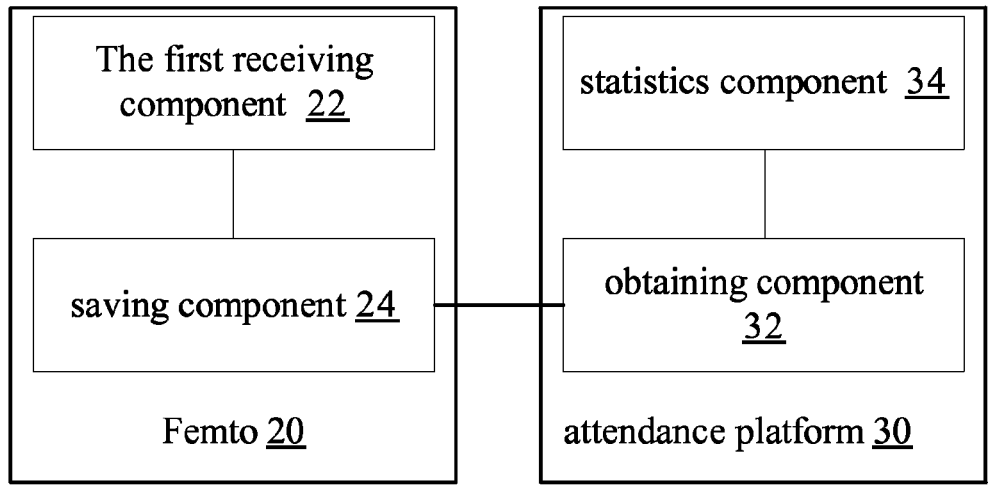
FIG. 3 is a structural diagram of a system for recording an attendance according to an embodiment of the disclosure.

A system for recording an attendance is provided in the one embodiment of the disclosure. FIG. 3 is a structural diagram of a system for recording an attendance according to an embodiment of the disclosure. As shown in FIG. 3, the system includes a Femto 20 which includes the device for recording an attendance as shown in FIG. 2. The system also includes an attendance platform 30, wherein the attendance platform 30 includes: a obtaining component 32 which is connected with the saving component 24 and configured to obtain an identifier of the mobile terminal and time corresponding to a registration request or the de-registration request of the mobile terminal which are saved in one or more Femto; and a statistics component 34 which is connected with the obtaining component 32 and configured to collect statistics to attendance records of the user corresponding to the mobile terminal according to the identifier of the mobile terminal and the time corresponding to the registration request or the de-registration request of the mobile terminal.

Preferably, the statistics component 34 may include: a reading component 342 which is configured to read a correspondence table for the identifier of the mobile terminal and the name of the user whose attendance is to be recorded in the database; and a generating component 344 which is configured to, according to the correspondence table for the identifier of the mobile terminal and the name of the user whose attendance is to be recorded, replace, in the correspondence table for the identifier of the mobile terminal and the time corresponding to the registration request or the de-registration request of the mobile terminal, the identifier of the mobile terminal with the name of the user corresponding to the mobile terminal to generate an attendance record table of the user.

Preferably, the statistics component 34 may include: a first recording element 346 which is configured to record the earliest registration request of the mobile terminal during the first specified time period as an on-duty attendance record of the user corresponding to the mobile terminal; and/or, a second recording element 348 which is configured to record the latest de-registration request of the mobile terminal during the second specified time period as an off-duty attendance record of the user corresponding to the mobile terminal.

Preferably, the obtaining component 32 may also be configured to obtain the identifier of the mobile terminal and the time corresponding to the registration request or the de-registration request of the mobile terminal which are saved in one or more Femto during the specified time period (e.g., 8:00 am-8:00 pm of workday).

Figure 4:
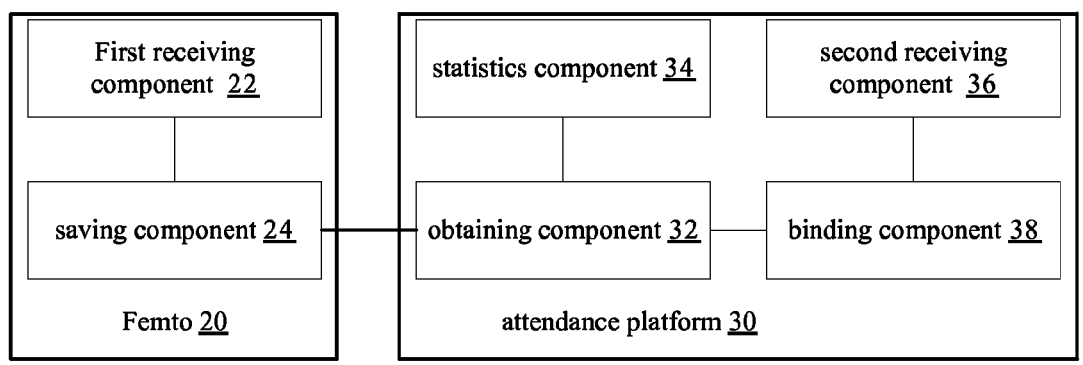
FIG. 4 is a first preferred structural diagram of a system for recording an attendance according to an embodiment of the disclosure.

FIG. 4 is a first preferred structural diagram of a system for recording an attendance according to an embodiment of the disclosure. As shown in FIG. 4, the attendance platform 30 may further include: a second receiving component 36 which is configured to receive mobile terminal information submitted by the user; and a binding component 38 connected with the obtaining component 32 and the second receiving component 36, and configured to save the correspondence between the name of the user and the identifier of the mobile terminal in the database according to the mobile terminal information, wherein the correspondence between the user whose attendance needs to be recorded and the IMEI of the mobile terminal may be saved in the database of the attendance platform in advance by using an inherent table, or binding may also be modified temporarily. This operation may usually be performed by an attendance administrator.

Figure 5:
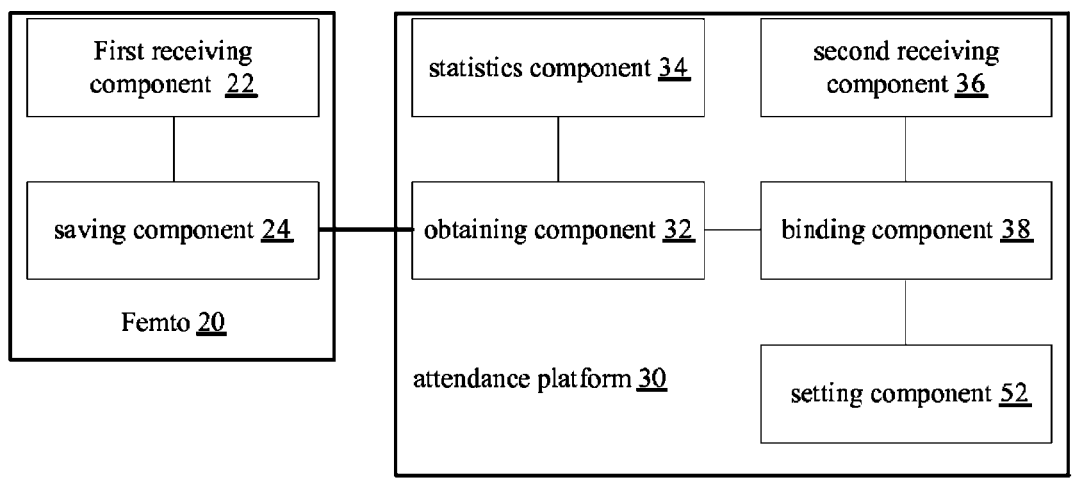
FIG. 5 is a second preferred structural diagram of a system for recording an attendance according to an embodiment of the disclosure.

FIG. 5 is a second preferred structural diagram of a system for recording an attendance according to an embodiment of the disclosure. As shown in FIG. 5, the attendance platform 30 may further include: a setting component 52 which is connected with the binding component 38 and configured to set operation permission of logging in the attendance platform for the user.

Figure 6:
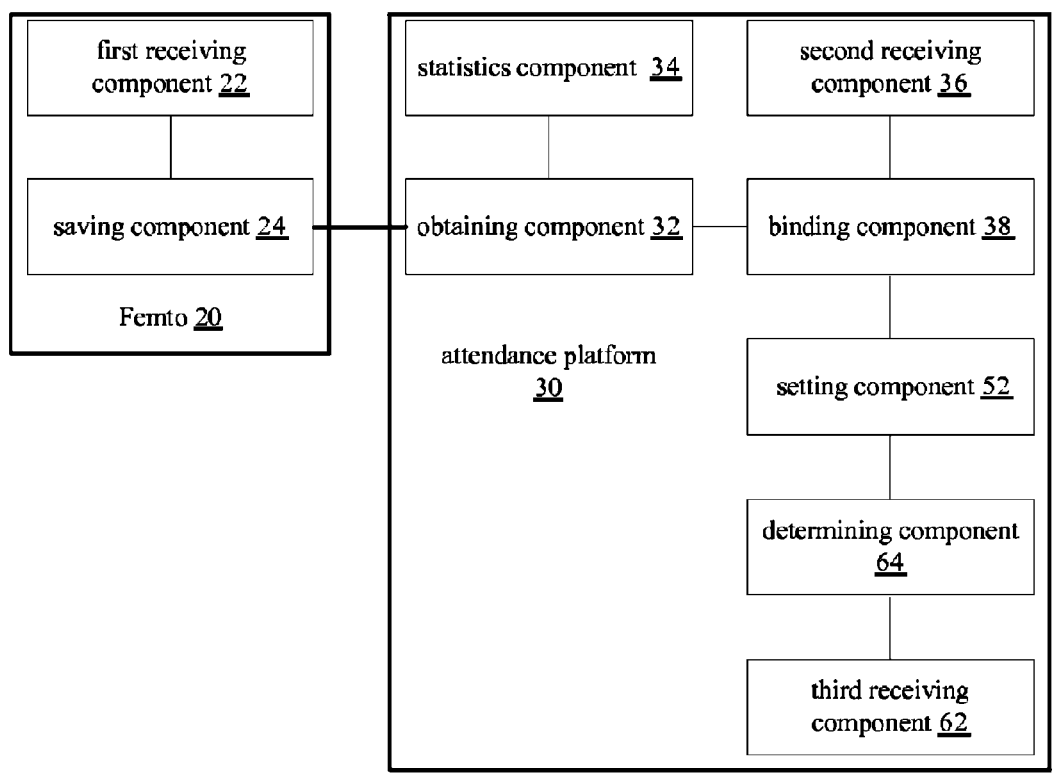
FIG. 6 is a third preferred structural diagram of a system for recording an attendance according to an embodiment of the disclosure.

FIG. 6 is a third preferred structural diagram of a system for recording an attendance according to an embodiment of the disclosure. As shown in FIG. 6, the attendance platform 30 may further include: a third receiving component 62 which is configured to receive at least one operation instruction of the login user, wherein the at least one operation instruction includes at least one of the followings: an operation instruction for querying the attendance record of the specified user, an operation instruction for displaying the attendance statistics result of the specified user, and an operation instruction for informing the specified user of the abnormal attendance situation; and a determining component 64 which is connected with the setting component 52 and the third receiving component 62 and configured to determine, based on the operation permission corresponding to the login user, whether to operate correspondingly according to the at least one operation instruction.

A description is given below in combination with preferred embodiments. The following preferred embodiments combine the above embodiments and their preferred implementation modes.

Embodiment 1

In one present preferred embodiment, a distributed attendance system based on a Femto is provided. The work flow of the system includes the following steps.

Step 2: in a period of attendance time, a mobile terminal enters a coverage area of a Femto, searches and resides in a Femto cell. The Femto provides a customized logo when providing a specialized presentation of its coverage area to the terminal, so as to prompt the employees whether they have entered a company's attendance scope through the presence of the logo.

Step 4: the Femto obtains an IMEI in a registration process of the mobile terminal, and saves the IMEI and the time of registration request together in a local list to serve as an on-duty attendance record. When the mobile terminal leaves the coverage area of the Femto, and the mobile terminal does not reside in the Femto cell any more. The Femto obtains the IMEI in a de-registration process of the mobile terminal, and saves the IMEI and the time of de-registration request together in the local list to serve as an off-duty attendance record.

Step 6: the attendance platform collects, through a network, the attendance records in the period of attendance time from each distributed Femto, converts the attendance records through the saved IMEI and the correspondence table for the IMEI and the employee, and obtains an effective attendance result by statistics according to a certain way and puts the result on record.

Through the above steps, by taking the Femto as a carrier and a key unit, an attendance information collecting part of the attendance system is integrated in a communication system, a role of the former IC card is replaced with a general mobile terminal, and a role of the punch-card machine is replaced with the Femto, which effectively utilizes resources of the communication system, highly automates an attendance process, and saves hardware cost.

Meanwhile, by utilizing private attribute and differentiation of the Femto, the problems are solved at the user without involving the operators. Such an attendance system solution embodies the optimized and the most reasonable design.

Embodiment 2

Figure 7:
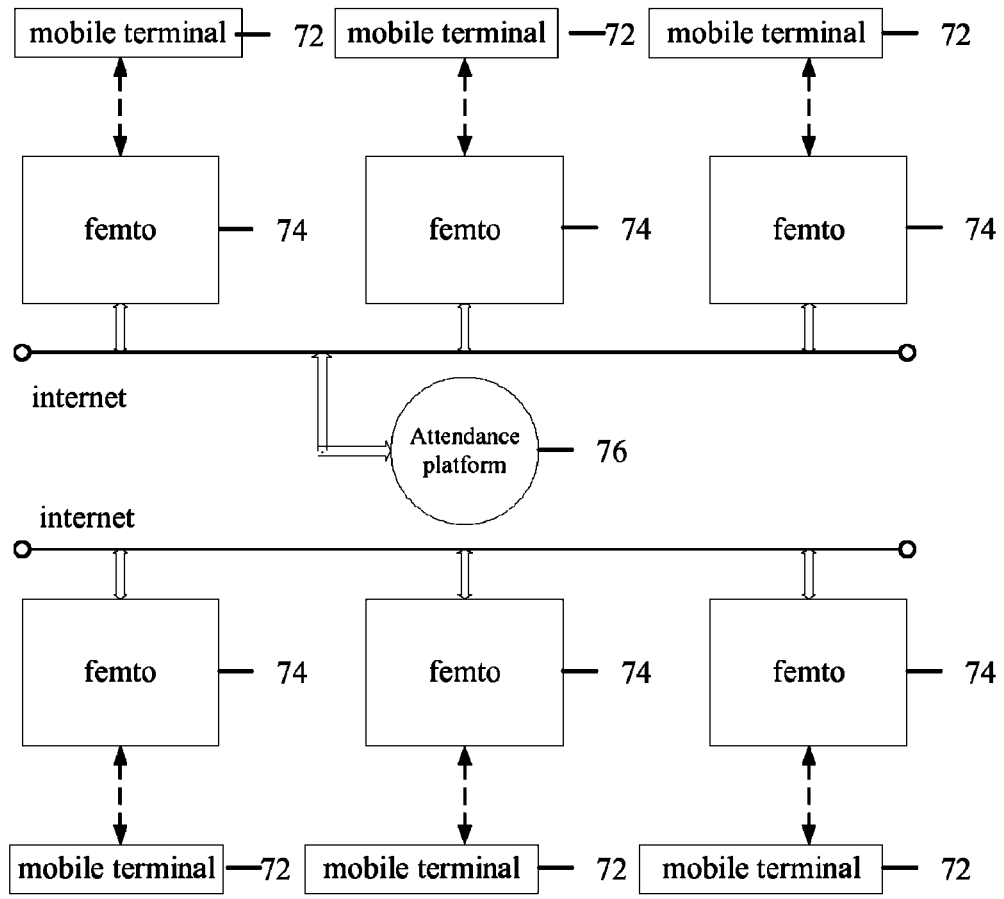
FIG. 7 is an overall diagram of a system for implementing attendance to a mobile terminal according to a second embodiment of the disclosure.

FIG. 7 is an overall diagram of a system for implementing attendance to a mobile terminal according to a second embodiment of the disclosure. As shown in FIG. 7, the system includes: a mobile terminal 72, a Femto 74 and an attendance platform 76, wherein the mobile terminal 72 is configured to search and reside in a cell of the Femto 74 when entering the coverage area of the Femto 74, and then initiate a registration request or the de-registration request to the Femto 74; the Femto 74 is configured to implement a function of a standard wireless communication device as well as record the IMEI of the mobile terminal 72 and the request time; the attendance platform 76 is configured to establish a communication connection with the Femto 74 distributed at each workplace through the Internet, obtain the original attendance record saved in the Femto 74, and then convert the attendance record through the correspondence table for the IMEI and the employee which is saved in advance, and collect statistics to the attendance result according to a certain way.

Figure 8:
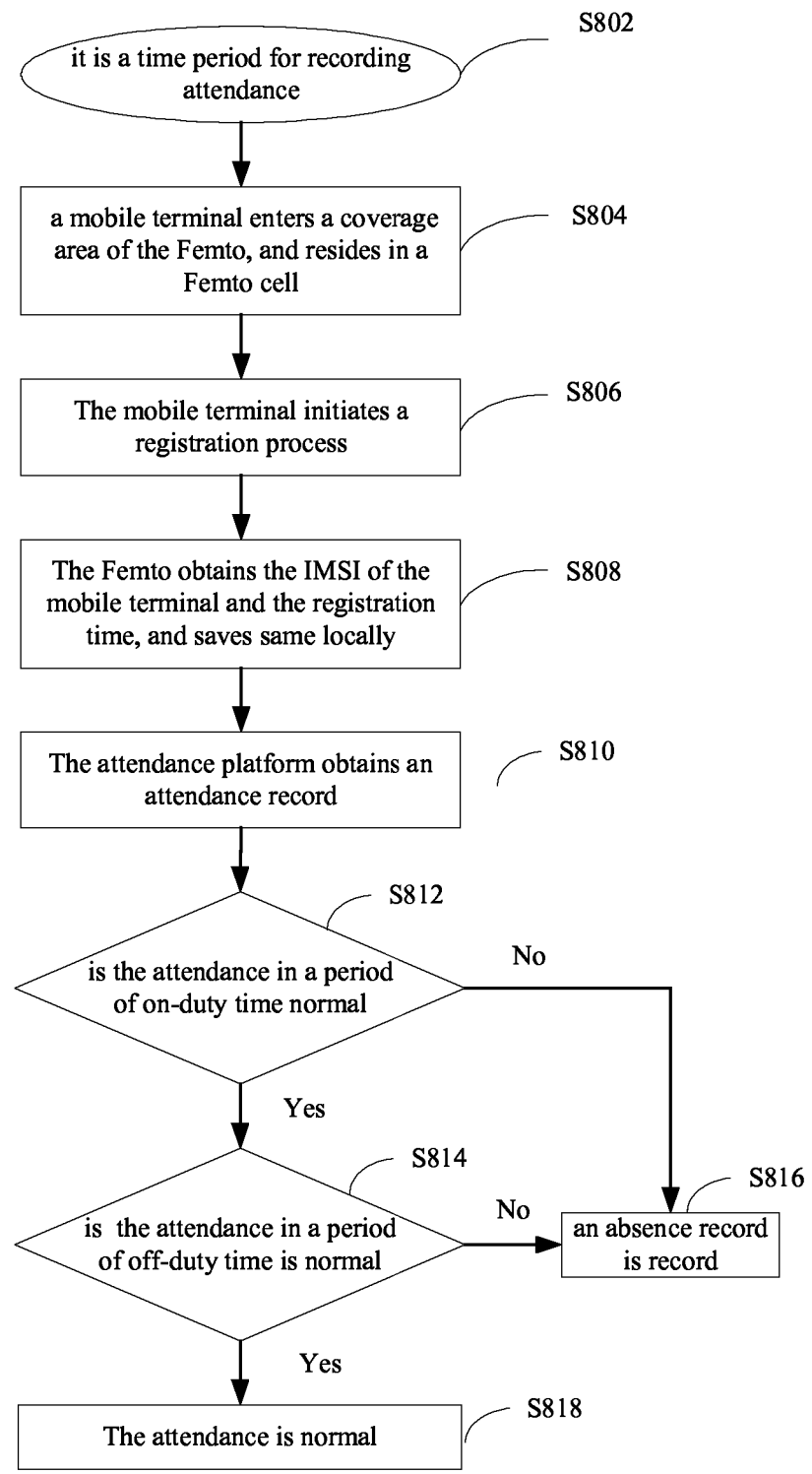
FIG. 8 is a work flowchart of a distributed attendance system based on the Femto according to the second embodiment of the disclosure.

In combination with the system shown in FIG. 7, one preferred embodiment also provides a work flow of a distributed attendance system based on a Femto. FIG. 8 is a work flowchart of a distributed attendance system based on a Femto according to a second embodiment of the disclosure. As shown in FIG. 8, the method includes the following steps:

Step 802: It is a period of attendance time in workday, and an attendance system operates normally in the period of attendance time, records an attendance action of a mobile terminal and collects statistics to the attendance action. For example, the period of attendance time is set as: 7:00-20:00 each day, from Monday to Friday.

Step 804: in a period of on-duty attendance time, a mobile terminal enters a work area covered by the Femto while the employee is on duty, searches and resides in the Femto cell. In a period of off-duty attendance time, the mobile terminal leaves the work area covered by the Femto while the employee is off duty, and leaves the Femto cell; for example, wherein the period of on-duty attendance time is set to be 7:00-8:30, and the period of off-duty attendance time is set to be 18:00-20:00.

The mobile terminals carried by the employees should have the access permission preset by the Femto, and may access the Femto legally. The employees submit and maintain their own mobile terminal information by logging in the attendance platform on Internet, and bind their own attendance with the mobile terminal. The attendance platform may set the access permission of the mobile terminal in the Femto according to the terminal information after delaying for a number of workdays;

Step 806: the mobile terminal establishes a Radio Resource Control (RRC) connection through the Femto, and initiates a request of registering to a core network. In the process, the mobile terminal needs to report some of its own information, including the IMEI. This part of information will be intercepted and saved in the Femto.

Step 808: as a standardized access device, the Femto assists the mobile terminal to establish the RRC connection and forwards the registration request to the core network. Meanwhile, as a key device of the attendance system, the Femto may also intercept, through a customized function, the information reported by the mobile terminal, including the IMEI, and saves both the time of registration request and the IMEI in a local database list for the attendance platform to query.

Step 810: the attendance platform establishes a connection with each Femto distributed at each workplace through the Internet to obtain the original attendance record from the Femto.

In the process of implementation, work of the attendance platform may include the following contents:

A: original attendance records are converted into attendance records of the employee according to a correspondence table for the IMEI of the mobile terminal and the employee which is generated and saved according to the attendance information reported by the employee.

B: the original records are processed according to a certain way, wherein a statistical method has the following points:

a) in the period of on-duty attendance time, the time of the earliest on-duty record is taken as an effective on-duty attendance;

b) in the period of off-duty attendance time, the time of the latest off-duty record is taken as an effective off-duty attendance;

c) in normal working hours, if a period of time from a certain off-duty record to the next on-duty record exceeds a certain set period of time (e.g., half an hour), then it is taken as an off-duty record;

C: it is displayed through a background interface for the attendance administrator to operate. The user interface has the following functions: the attendance administrator may query the attendance record of related personnel in a certain company through the background interface, including an on-duty situation, and whether there is absence; the attendance administrator may collect statistics to the attendance records of related personnel in a certain company; the attendance administrator may inform, through short message, the abnormal attendance situation of related personnel in a certain company.

For example, statistics of the attendance results may be collected by the following steps.

Step 812: it is determined whether the on-duty attendance time of the employee is normal; if so, turn to Step 814; or else, turn to Step 816.

Step 814: it is determined whether the off-duty attendance time of the employee is normal; if so, turn to Step 818; or else, turn to Step 816.

Step 816: it is recorded an absence of the employee.

Step 818: the statistical attendance result of the employee is normal.

Through the above detailed description of the implementation method, the preferred embodiment provides a method for implementing the distributed attendance system based on the Femto in the communication system. Compared with the electronic attendance system with contactless IC card which is widely used now, the disclosure has advantages of high automation level and convenience; besides, because an attendance information collecting function is integrated in the existing communication system, hardware cost is further saved; compared with other existing solutions based on the communication system, the disclosure has advantages of not needing to customize the mobile terminal and a core network device of the operators, and integrating all the customized functions in the Femto with the characteristic of differentiation, thus the solutions of the disclosure are designed more optimally and reasonably.

In another embodiment, software is also provided, which is used for implementing the above embodiments and the technical solutions described in the preferred embodiments.

In another embodiment, a storage medium is also provided, which stores the software; the storage medium includes but is not limited to compact disc, floppy disk, hard disk, erasable memory and so on.

Obviously, the skilled personnel in the field should appreciate that the above components and steps of the disclosure can be implemented by a general-purpose computing device, and they can be centralized in a single computing device or distributed on a network composed of multiple computing devices; optionally, they can be implemented by a program code which is capable of being executed by the computing device, so that they can be stored in a storage device and executed by the computing device; in addition, under some conditions, the presented or described steps can be executed in an order different from that described here; or they are made into integrated circuit components, respectively; or multiple components and steps of them are made into a single integrated circuit component to realize. In this way, the disclosure is not limited to any particular combination of hardware and software.

The above is only the preferred embodiment of the disclosure and not intended to limit the disclosure; for the skilled personnel in the field, the disclosure may have various modifications and changes. Any modifications, equivalent replacements, improvements and the like within the spirit and principle of the disclosure shall fall within the scope of the claims of the disclosure.

What is claimed is:

1. A method for recording an attendance, comprising:
    receiving, by a Femto, a registration request or a de-registration request of a mobile terminal, wherein the registration request or the de-registration request comprises an identifier of the mobile terminal; and
    saving, by the Femto, the identifier of the mobile terminal and time corresponding to the registration request or the de-registration request of the mobile terminal together to serve as an attendance record of a user corresponding to the mobile terminal;
    wherein after saving, by the Femto, the identifier and the time corresponding to the registration request or the de-registration request of the mobile terminal together, the method further comprises: obtaining, by an attendance platform, the identifier of the mobile terminal and the time corresponding to the registration request or the de-registration request of the mobile terminal which are saved in one or more Femto; and collecting statistics, by the attendance platform, to attendance records of the user corresponding to the mobile terminal according to the identifier of the mobile terminal and the time corresponding to the registration request or the de-registration request of the mobile terminal;
    wherein collecting statistics, by the attendance platform, to the attendance records of the user corresponding to the mobile terminal according to the identifier of the mobile terminal and the time corresponding to the registration request or the de-registration request of the mobile terminal comprises: the attendance platform reading, in a database, a correspondence table for the identifier of the mobile terminal and a name of a user whose attendance is to be recorded; according to the correspondence table for the identifier of the mobile terminal and the name of the user whose attendance is to be recorded, the attendance platform replacing, in a correspondence table for the identifier of the mobile terminal and the time corresponding to the registration request or the de-registration request of the mobile terminal, the identifier of the mobile terminal with the name of the user corresponding to the mobile terminal to generate an attendance record table of the user.

2. The method according to claim 1, wherein collecting statistics, by the attendance platform, to the attendance records of the user corresponding to the mobile terminal according to the identifier of the mobile terminal and the time corresponding to the registration request or the de-registration request of the mobile terminal comprises:
    the attendance platform recording the earliest registration request of the mobile terminal during the first specified time period as an on-duty attendance record of the user corresponding to the mobile terminal; and/or,
    the attendance platform recording the latest de-registration request of the mobile terminal during the second specified time period as an off-duty attendance record of the user corresponding to the mobile terminal.

3. The method according to claim 1, wherein obtaining, by the attendance platform, the identifier of the mobile terminal and the time corresponding to the registration request or the de-registration request of the mobile terminal which are saved in the one or more Femto comprises:
    the attendance platform obtaining the identifier of the mobile terminal and the time corresponding to the registration request or the de-registration request of the mobile terminal which are saved in the one or more Femto during a specified time period.

4. The method according to claim 1, wherein before obtaining, by the attendance platform, the identifier of the mobile terminal and the time corresponding to the registration request or the de-registration request of the mobile terminal which are saved in the one or more Femto, the method further comprises:
    receiving, by the attendance platform, mobile terminal information submitted by the user; and
    saving, by the attendance platform, a correspondence between the name of the user and the identifier of the mobile terminal in the database according to the mobile terminal information.

5. The method according to claim 4, wherein after establishing and saving, by the attendance platform, the correspondence between the name of the user and the identifier of the mobile terminal according to the mobile terminal information, the method further comprises:
    setting, by the attendance platform, operation permission of logging in the attendance platform for the user.

6. The method according to claim 5, wherein after collecting statistics, by the attendance platform, to the attendance records of the user corresponding to the mobile terminal according to the identifier of the mobile terminal and the time corresponding to the registration request or the de-registration request of the mobile terminal, the method further comprises:
    receiving, by the attendance platform, at least one operation instruction of a login user, wherein the at least one operation instruction comprises at least one of the followings: an operation instruction for querying attendance records of a specified user, an operation instruction for displaying an attendance statistics result of the specified user, and an operation instruction for informing the specified user of an abnormal attendance situation; and
    determining, based on the operation permission corresponding to the login user, by the attendance platform, whether to operate correspondingly according to the at least one operation instruction.

7. The method according to claim 1, wherein the time corresponding to the registration request or the de-registration request of the mobile terminal comprises at least one of the followings:
   time when the Femto receives the registration request or the de-registration request of the mobile terminal; and
   time of initiating the registration request or the de-registration request which is carried in the registration request or the de-registration request.

8. The method according to claim 1, wherein the identifier of the mobile terminal comprises:
   an International Mobile Equipment Identity (IMEI) of the mobile terminal.

9. The method according to claim 1, wherein after receiving, by the Femto, the registration request or the de-registration request of the mobile terminal, the method further comprises:
   providing, by the Femto, a preset Public Land Mobile Network (PLMN) Identity (ID)for the mobile terminal.

10. A device for recording an attendance, wherein the device is provided in a Femto and comprises:
   a first receiving component configured to receive a registration request or a de-registration request of a mobile terminal, wherein the registration request or the de-registration request comprises an identifier of the mobile terminal; and
   a saving component configured to save the identifier of the mobile terminal and time corresponding to the registration request or the de-registration request of the mobile terminal together to serve as an attendance record of a user corresponding to the mobile terminal; in order to make an attendance platform replace, according to the correspondence table for the identifier of the mobile terminal and the name of the user whose attendance is to be recorded, in a correspondence table of the identifier of the mobile terminal and the time corresponding to the registration request or the de-registration request of the mobile terminal, the identifier of the mobile terminal with the name of the user corresponding to the mobile terminal to generate an attendance record table of the user.

11. A system for recording an attendance, wherein the system comprises a device for recording an attendance according to claim 10 and an attendance platform, wherein the attendance platform comprises:
   an obtaining component configured to obtain an identifier of a mobile terminal and time corresponding to a registration request or a de-registration request of the mobile terminal which are saved in one or more Femto; and
   a statistics component configured to collect statistics to attendance records of a user corresponding to the mobile terminal according to the identifier of the mobile terminal and the time corresponding to the registration request or the de-registration request of the mobile terminal;
   wherein the statistics component comprises: a reading component configured to read, in a database, a correspondence table for the identifier of the mobile terminal and a name of a user whose attendance is to be recorded; and a generating component configured to, according to the correspondence table for the identifier of the mobile terminal and the name of the user whose attendance is to be recorded, replace, in a correspondence table of the identifier of the mobile terminal and the time corresponding to the registration request or the de-registration request of the mobile terminal, the identifier of the mobile terminal with the name of the user corresponding to the mobile terminal to generate an attendance record table of the user.

12. The system according to claim 11, wherein the statistics component comprises:
   a first recording element configured to record the earliest registration request of the mobile terminal during the first specified time period as an on-duty attendance record of the user corresponding to the mobile terminal; and/or,
   a second recording element configured to record the latest de-registration request of the mobile terminal during the second specified time period as an off-duty attendance record of the user corresponding to the mobile terminal.

13. The system according to claim 11, wherein the obtaining component is further configured to obtain the identifier of the mobile terminal and the time corresponding to the registration request or the de-registration request of the mobile terminal which are saved in one or more Femto during the specified time period.

14. The system according to claims 11, wherein the attendance platform further comprises:
   a second receiving component configured to receive mobile terminal information submitted by the user; and
   a binding component configured to save a correspondence between the name of the user and the identifier of the mobile terminal in the database according to the mobile terminal information.

15. The system according to claim 14, wherein the attendance platform further comprises:
   a setting component configured to set operation permission of logging in the attendance platform for the user.

16. The system according to claim 15, wherein the attendance platform further comprises:
   a third receiving component configured to receive at least one operation instruction of a login user, wherein the at least one operation instruction comprises at least one of the followings: an operation instruction for querying attendance records of a specified user, an operation instruction for displaying an attendance statistics result of the specified user, and an operation instruction for informing the specified user of an abnormal attendance situation; and
   a determining component configured to determine, based on the operation permission corresponding to the login user, whether to operate correspondingly according to the at least one operation instruction.

* * * * *